(12) United States Patent
Cotte et al.

(10) Patent No.: US 11,488,301 B2
(45) Date of Patent: Nov. 1, 2022

(54) METHOD FOR ESTIMATING PARAMETERS OF AN OBJECT WHICH IS TO BE ESTIMATED IN A DIGITAL IMAGE, AND METHOD FOR REMOVING THE OBJECT FROM THE DIGITAL IMAGE

(71) Applicant: TRIXELL, Moirans (FR)

(72) Inventors: Florian Cotte, Moirans (FR); Jean-Michel Vignolle, Moirans (FR)

(73) Assignee: TRIXELL, Moirans (FR)

( * ) Notice: Subject to any disclaimer, the term of this patent is extended or adjusted under 35 U.S.C. 154(b) by 180 days.

(21) Appl. No.: 16/967,710

(22) PCT Filed: Feb. 11, 2019

(86) PCT No.: PCT/EP2019/053284
§ 371 (c)(1),
(2) Date: Aug. 5, 2020

(87) PCT Pub. No.: WO2019/155051
PCT Pub. Date: Aug. 15, 2019

(65) Prior Publication Data
US 2021/0035292 A1    Feb. 4, 2021

(30) Foreign Application Priority Data

Feb. 9, 2018    (FR) .................................... 1851119

(51) Int. Cl.
*G06T 7/00*    (2017.01)
*G06T 7/70*    (2017.01)
(Continued)

(52) U.S. Cl.
CPC .......... *G06T 7/0012* (2013.01); *G06K 9/6255* (2013.01); *G06T 7/60* (2013.01);
(Continued)

(58) Field of Classification Search
CPC ........... G06T 7/0012; G06T 7/60; G06T 7/70; G06T 2207/10116; G06T 2207/30004;
(Continued)

(56) References Cited

U.S. PATENT DOCUMENTS

| 10,678,866 B1 * | 6/2020 | Ranganathan ........ G06F 40/197 |
| 2017/0091964 A1 | 3/2017 | Luo et al. |
| 2017/0154413 A1 | 6/2017 | Yu et al. |

FOREIGN PATENT DOCUMENTS

WO    2014/172421 A1    10/2014

OTHER PUBLICATIONS

Yardibi et al., "Source localization and sensing: A nonparametric Iterative Adaptive Approach based on weighted least squares", Aerospace and Electronic Systems, IEEE Transactions on 46.1, pp. 425-443, 2010.

(Continued)

*Primary Examiner* — Siamak Harandi
(74) *Attorney, Agent, or Firm* — BakerHostetler

(57) ABSTRACT

A method for estimating parameters of an object which is to be estimated in a digital image which represents real imaged content, comprising at least: a) an initial step comprising the production of a dictionary of content components and the production of a dictionary of object components, the content components and the object components having the same dimensions as the digital image; b) a step of establishing, at the same time, the magnitude of each of the content components of the dictionary of content components and of the object components of the dictionary of object components present in the digital image; c) a step of establishing, from the magnitude of each of the object components, the value of at least one parameter which characterizes the object to be estimated.

21 Claims, 5 Drawing Sheets

(51) Int. Cl.
*G06K 9/62* (2022.01)
*G06T 7/60* (2017.01)

(52) U.S. Cl.
CPC ...... *G06T 7/70* (2017.01); *G06T 2207/10116* (2013.01); *G06T 2207/30004* (2013.01)

(58) Field of Classification Search
CPC .............. G06K 9/6255; G06K 9/6269; G06V 2201/031; G06N 20/00
See application file for complete search history.

(56) References Cited

OTHER PUBLICATIONS

Tan, et al., "Sparse Learning via Iterative Minimization with application to MIMO Radar Imaging", IEEE Transactions on Signal Processing, vol. 59, No. 3, pp. 1088-1101, Mar. 2011.

Chen, et al., "Artifact Suppressed Dictionary Learning for Low-Dose CT Image Processing", IEEE Transactions on Medical Imaging, vol. 33, No. 12, pp. 2271-2292, Dec. 1, 2014.

Xiao, et al., "Poisson noise removal via learned dictionary", IEEE International Conference on Image Processing, pp. 1177-1180, Sep. 26, 2010.

Xu, et al., "Low-Dose X-ray CT Reconstruction via Dictionary Learning", IEEE Transactions on Medical Imaging, vol. 31, No. 9, pp. 1682-1697, Sep. 1, 2012.

\* cited by examiner

METHOD FOR ESTIMATING PARAMETERS OF AN OBJECT WHICH IS TO BE ESTIMATED IN A DIGITAL IMAGE, AND METHOD FOR REMOVING THE OBJECT FROM THE DIGITAL IMAGE

CROSS-REFERENCE TO RELATED APPLICATIONS

This application is a National Stage of International patent application PCT/EP2019/053284, filed on Feb. 11, 2019, which claims priority to foreign French patent application No. FR 1851119, filed on Feb. 9, 2018, the disclosures of which are incorporated by reference in their entirety.

FIELD OF THE INVENTION

The invention relates to a method for estimating one or more parameters of an object to be estimated in a digital image, and to a method for removing the object from the digital image. It is in particular applicable to digital images obtained by X-ray imaging, but may be extended to any type of digital imager, for example one that images infrared radiation or even light in the visible spectrum.

BACKGROUND

In the present patent application, three components may be present in the digital image:
1. The clinical content or backdrop, corresponding to the imaged real object that it is sought to view. It may for example be a question, with X-ray imaging, of a patient or of a region of a patient.
2. Acquisition noise, corresponding to random perturbations of the formation of the images. It may be a question of electronic noise, to which must be added, in X-ray imaging, photonic noise due to the low number of photons present in the image and that follows a Poisson distribution.
3. The objects that it is sought to estimate, and which may prove to be detrimental to viewing of the content.

The digital image may then be written in two different ways depending on whether the noise is processed independently of the two other components:

Image=Object+Content+Noise or considered to belong to the content:

Image=Object+Content

FIG. 1 shows an example of an image containing an object to be estimated. In the present case, this figure shows a radiological image the content of which is a region of a patient. In order to improve the contrast of the image, and more particularly the quality of the radiological image, it is common for the practitioner to use an anti-scatter grid. Located between the patient and the detector, it allows the contribution of the radiation scattered and caused by the patient to be decreased. In FIG. 1, the horizontal variations are thus due to the presence of the anti-scatter grid; these variations may mask a substantial amount of information, and potentially lead to a poor diagnosis. Image processing must therefore be applied, in order to remove these horizontal variations from the digital image, without however modifying the content.

Such processing is however confronted with two main difficulties. It is firstly necessary to be able to remove solely the object even though the image also contains noise, and even though the content may be a very strong and unpredictable signal. Specifically, the content may vary greatly depending on the region of the patient to be imaged, and, for a given region, the content may vary from one patient to the next. The other difficulty is due to the fact that the object to be estimated is not perfectly defined, i.e. a number of parameters of the object may not be known. FIG. 2 shows another example of an object to be estimated. It is a question of a square CR superposed on the image IM, which hinders correct viewing of the content. Neither the amplitude of the object (the value of the pixel, for example the grayscale for a radiological image), nor the size of the object are known.

Currently, two types of solutions allow a signal to be processed in order to remove therefrom undesired components.

The first encompasses conventional filters, in particular the matched filter, the Wiener filter or even the Kalman filter. These solutions are based on estimating and statistically modeling the content and the signal that hinders estimation of the content (generally random noise, which is decorrelated from the content). In our case, the content (the patient) is not modelable but it however represents most of the signal present in the image. Such solutions may therefore be implemented in "flat" regions of the image, in which the patient is not present, but remain sub-optimal when the patient is present. These solutions in addition have the drawback that removing the object modifies, to a greater or lesser extent, the content of the image, for example if the image contains a component that resembles the object to be removed. With reference to FIG. 1, if there is, in the content acquired by the detector, an element resembling the anti-scatter grid, this element will potentially be removed if a matched filter is employed.

The second type of solution encompasses spectral estimation methods, in particular the IAA method (IAA being the acronym of Iterative Adaptive Approach) in particular described in the article "*Source localization and sensing: A nonparametric Iterative Adaptive Approach based on weighted least squares*"(Yardibi T. et al., Aerospace and Electronic Systems, IEEE Transactions on 46.1 2010), and the SLIM method (SLIM being the acronym of Sparse Learning via Iterative Minimization) in particular described in the article "*Sparse Learning via Iterative Minimization with application to MIMO Radar Imaging*" (Tan X. et al., IEEE Transactions on Signal Processing, vol. 59, no. 3, March 2011). These methods are suitable for application to the field of radars and telecommunications, in which the signal is one-dimensional, but cannot be transposed in the prior art to the case of a two-dimensional signal, and thus be used for image processing. Moreover, in the SLIM method, the noise is assumed to be white. This postulate cannot be used for an image acquired by a detector, in which case the noise is specific to each imaging technique. In particular, in X-ray imaging, the photonic noise is not white.

Lastly, the aforementioned methods consider only two signals, namely the content and the noise. They therefore do not allow one or more parameters of an object hindering viewing of the content, and distinct from the acquisition noise, to be estimated.

SUMMARY OF THE INVENTION

The invention therefore aims to obtain a method for estimating one or more parameters of an object to be estimated in a digital image, this object being distinct from the acquisition noise, the method not requiring either the content, or the object to be estimated, or the acquisition noise to be exactly known beforehand. The invention also relates to a method for removing the object from the digital image, which method does not modify, in the image, the content corresponding to the imaged real object.

One subject of the invention is therefore a method for estimating one or more parameters of an object to be estimated in a digital image representing an imaged real content, comprising at least:
- a) an initial step comprising creating a dictionary of content components and creating a dictionary of object components, the content components and the object components having the same dimensions as the digital image;
- b) a step of conjointly determining the amplitude of each of the content components of the dictionary of content components and of the object components of the dictionary of object components present in the digital image;
- c) a step of determining the value of at least one parameter characterizing the object to be estimated on the basis of the amplitude of each of the object components.

Advantageously, the step c) of determining the value of at least one parameter characterizing the object to be estimated comprises the sub-steps of:
- determining a sub-set of object components of highest amplitude;
- determining the value of said parameter depending on a linear combination of the object components of said sub-set.

Advantageously, the creation of the content dictionary comprises generating a set of images of two-dimensional sinusoidal signals.

As a variant, the creation of the content dictionary comprises generating a set of images representative of the modulation transfer function of the sensor that forms the digital image.

As a variant, the content dictionary is created using a machine-learning algorithm.

Advantageously, the machine-learning algorithm is a K-SVD algorithm.

Advantageously, the creation of a dictionary of object components comprises generating a set of images each having a different value of the parameter.

Advantageously, the parameter is selected from a set comprising the frequency, shape, size and location of the object.

Advantageously, the conjointly determining step b) is carried out by iteratively determining an estimation vector ($\beta$) containing the various amplitude values of each of the components of the content dictionary and of the object dictionary present in the image, until convergence of the estimation vector ($\beta$).

Advantageously, the estimation vector ($\beta$) is considered to have converged when the norm of the estimation vector ($\beta$) remains below a preset threshold for two successive iterations.

As a variant, the estimation vector ($\beta$) is considered to have converged at the end of a preset number of iterations.

Advantageously, the method comprises, at the end of each iteration, a step of modifying the components of the dictionary of content components and/or of the dictionary of object components so as to minimize a projection error ($\varepsilon$) defined by:

$$\varepsilon = |y - D\beta|^2,$$

where y is the vector representing the digital image, and D is the matrix representing the components of the dictionary to be modified.

Advantageously, the conjointly determining step b) comprises iteratively determining an estimation of the noise variance ($\sigma^2$), this being determined on the basis of the estimation vector ($\beta$) and of a correlation matrix N of the noise present in the digital image, until the estimation of the noise variance ($\sigma^2$) converges.

Advantageously, the correlation matrix N of the noise is determined via a priori knowledge of the detector used to acquire the digital image.

Advantageously, the method comprises a step d) of reconstructing the image of content via linear combination of all the content components.

Advantageously, the digital image is acquired by X-ray imaging.

The invention also relates to a method for removing an object present in a digital image representing an imaged real content, comprising the steps of:
- estimating the value of at least one parameter of the object and its amplitude using the parameter-estimating method as claimed in one of the preceding claims;
- estimating the object on the basis of the value of the parameter characterizing the object and its amplitude;
- subtracting pixel-by-pixel the estimated object from the digital image.

BRIEF DESCRIPTION OF THE DRAWINGS

Other features, details and advantages of the invention will become more clearly apparent on reading the description, which is given with reference to the appended drawings, which are given by way of example and show, respectively.

DETAILED DESCRIPTION

Figure 2:
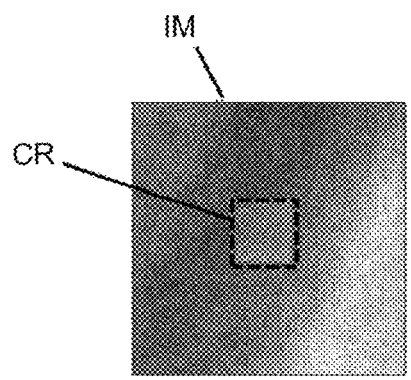
FIG. 2, an example of an object to be estimated in a digital image.

FIG. 2 illustrates a digital image IM, containing an object (a square CR) that whitens a corresponding portion of the digital image. In FIG. 2, the dashed lines encircling the square CR are shown merely for the sake of clarity of the figure. It is therefore sought to estimate the value of at least one parameter characterizing the object, and the amplitude of the object, with a view to estimating by how much the square CR lightens the image.

Figure 3:
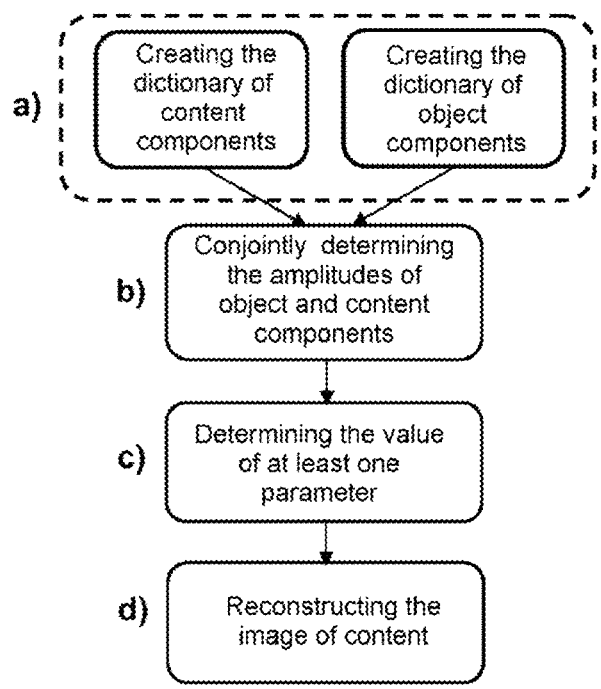
FIG. 3, a functional schematic of the method according to the invention.

FIG. 3 illustrates a functional schematic of the method according to the invention.

The initial first step a) consists in creating a dictionary of content components and in creating a dictionary of object components.

A first sub-step therefore consists in creating a dictionary of content components.

Figure 4A:
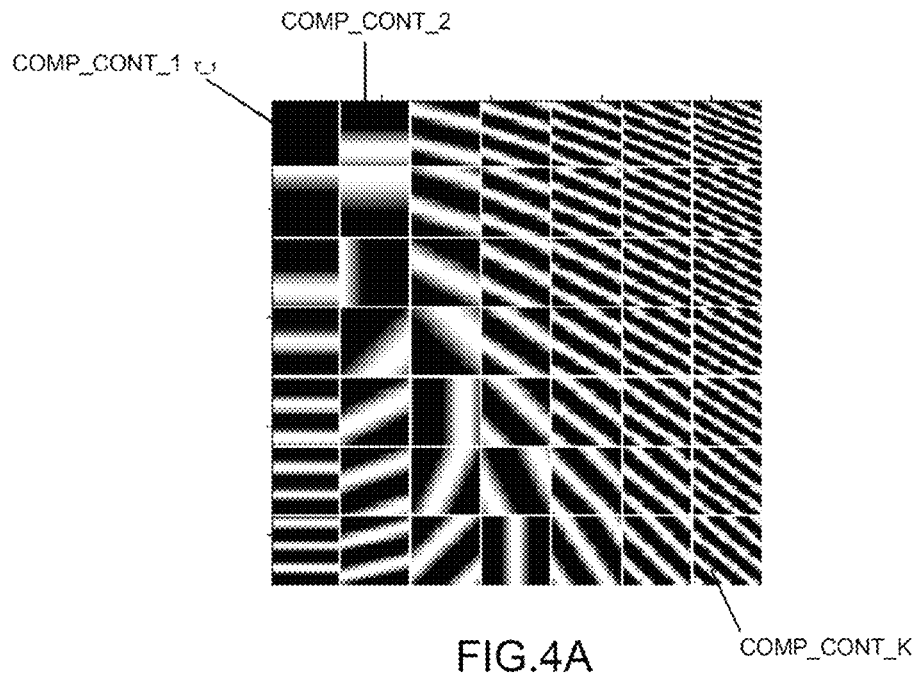
FIG. 4A, one example of a dictionary of content components, this dictionary being obtained on the basis of Fourier components.

According to a first embodiment, the dictionary of content components may be created without a priori, by generating a set of images of basic two-dimensional sinusoidal signals. FIG. 4A illustrates such a dictionary. Each of the content components (COMP_CONT_1, COMP_CONT_2, . . . , COMP_CONT_K) (K being higher than or equal to 1) represents one two-dimensional sinusoidal signal, namely at one particular frequency. The content components shown are referred to as Fourier components. The number of content components shown in FIG. 4 is non-limiting.

Figure 4B:
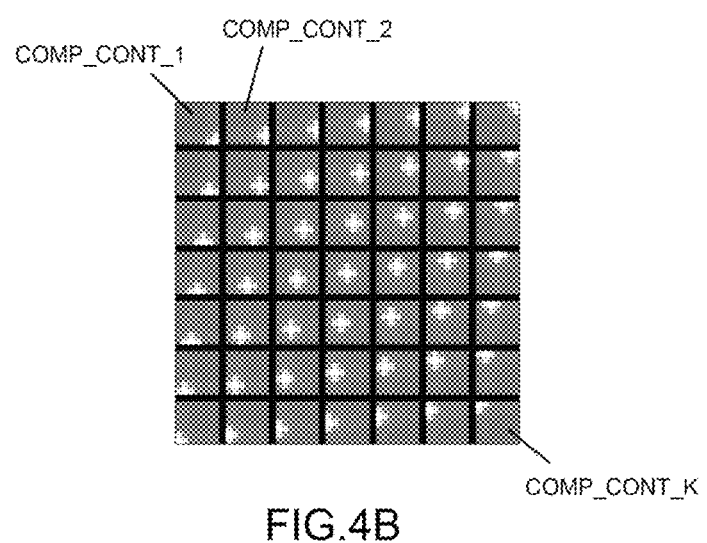
FIG. 4B, another example of a dictionary of content components, this dictionary being obtained on the basis of the impulse response of the detector.

According to another embodiment, the dictionary of content components may be created by generating a set of images representative of the modulation transfer function of the sensor that forms the digital image. FIG. 4B illustrates such a dictionary. This dictionary is generated on the basis of the impulse response of the detector. Each of the components (COMP_CONT_1, COMP_CONT_2, . . . , COMP_CONT_K) (K being higher than or equal to 1) represents the impulse response of the detector for one pixel. The content dictionary therefore consists of the set of all of these images, for each of the pixels of the detector. This dictionary is advantageously close to the physical characteristics of the detector, in particular in X-ray imaging.

According to another embodiment, the dictionary of content components may be created using a machine-learning algorithm, and in particular using the K-SVD algorithm. The K-SVD algorithm is particularly suitable for creating and learning dictionary components, this making it easy to implement. The dictionary of content components using such an algorithm may for example create the components from a bank of X-ray radiography images. Other machine-learning algorithms, for example neural networks or even an SVM algorithm (SVM being the acronym of Support Vector Machine) may be used.

The dimensions of each content component may be the same as the dimensions of the digital image in which the object is found. The parameter estimation may also be carried out on one portion of the digital image, for example if the object is very localized. In this case, the dimensions of each content component are the same as the dimensions of the portion of the digital image.

A second sub-step of the initial first step a) consists in creating a dictionary of object components. The dictionary of object components may be created by generating a set of images each having a different value of the parameter. The parameter may be, non-exhaustively, the frequency, shape, size and location of the object.

Figure 5:
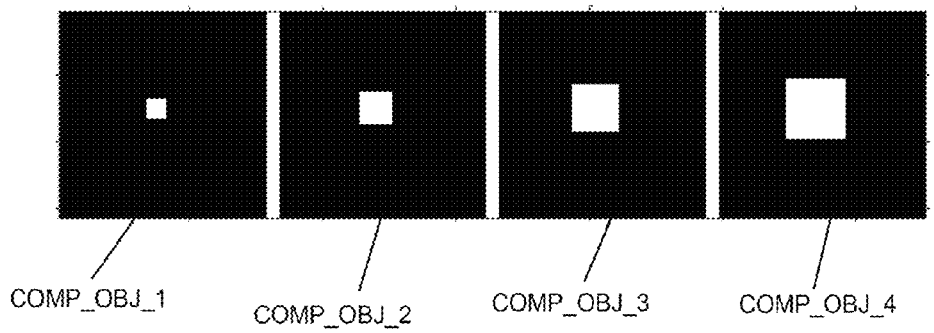
FIG. 5, an example of a dictionary of object components, for which dictionary the parameter to be estimated is the size of a square.

FIG. 5 illustrates an example of a dictionary of object components, for which dictionary the parameter to be estimated is the size of the square to be estimated in FIG. 2. The number of object components (COMP_OBJ_1, COMP_OBJ_2, COMP_OBJ_3, COMP_OBJ_4) present in FIG. 5, namely the number of possible values that the parameter to be estimated may take, is non-limiting. It may in particular comprise as many components as there are different sizes of squares in the digital image (for example 1×1 pixel, 2×2 pixels, 3×3 pixels, etc.).

The most frequent case is that in which there is one parameter to be estimated (for example the size of the square) and the amplitude of the corresponding object. Thus, the dictionary of object components comprises as many object components as there are possible values of the parameter. The object component having the highest amplitude corresponds to the correct parameter value. It is also possible to envision the case where there are a plurality of parameters to be estimated (for example, the location and size of the square) in addition to the amplitude of the corresponding object. If the object is a sum of known components of unknown amplitudes, it is then necessary to estimate the amplitudes of each of the components.

Thus a dictionary of content components and a dictionary of object components are obtained. Each component is a matrix of I rows and J columns that will be written in the form of a vector of size M, M being the size of the image, or of the portion of the image in which the object is found (i.e. all the corresponding pixels).

The amplitude of each of the content components of the dictionary of content components and of the object components of the dictionary of object components present in the digital image may be conjointly determined (step b) in FIG. 3) according to two embodiments, which are described below.

$1^{st}$ Embodiment

In this first embodiment, the noise present in the digital image is processed separately from the content and from the object. This separate processing may be justified by the different nature of the processed data: the data of the content and of the object are not random, whereas those of the noise are.

Let D be a matrix of M×L size containing the various components to be estimated (object and content). The matrix D is therefore a concatenation of the dictionary of content components and of the dictionary of object components. L is the number of components of the dictionary of content components and of the dictionary of object components. $D^i$, which is a vector of size M, is the $i^{th}$ component of the matrix D.

Information on the correlation of the noise present in the digital image is put into a matrix N, different from the matrix D. The noise present in the digital image is therefore processed separately from the content and from the object. The correlation matrix N of the noise may be determined via a priori knowledge of the detector used to acquire the digital image. Specifically, the noise may be specific to each imaging technique (X-rays, infrared, visible). In particular, in X-ray imaging, the photonic noise is generally not white noise. The correlation matrix N of the noise may be estimated using the Wiener-Khintchine theorem, by taking the inverse Fourier transform of the spectral power density of a "flat" image, i.e. an image with no content.

As a variant, if it is assumed that there is no correlation between the pixels, N may be an identity matrix of M×M size.

Let y be a vector representing the digital image, namely the value (also called brightness) of each pixel.

Let β be an estimation vector, of size L, containing the estimated amplitudes of each component $D^i$. Thus, $\beta=[\beta_1, \beta_2, \ldots, \beta_L]$.

Let a, b and q be parameters of the algorithm, a and b depending on the nature and on knowledge of the noise. If nothing in particular is known about the noise, then a=0 and b=0.

Figure 6:
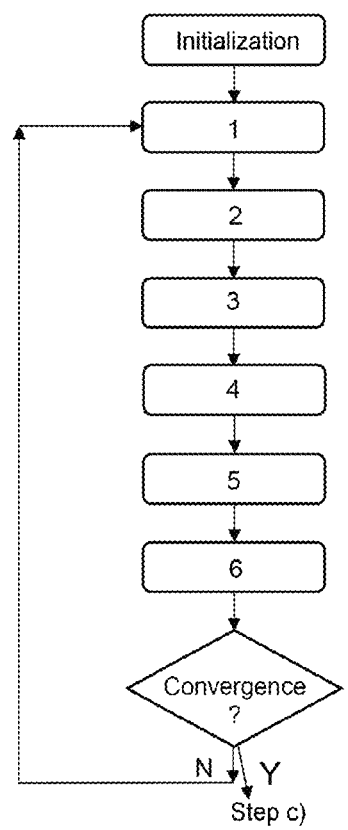
FIG. 6, a schematic illustration of the various steps of the algorithm for conjointly determining the amplitudes of object and content components, according to a first embodiment.

The algorithm for conjointly determining the amplitude of each of the content components of the dictionary of content components and of the object components of the dictionary of object components present in the digital image comprises an initializing step, and six iterated steps, as illustrated in FIG. 6.

Initializing Step

The value of the estimation vector β may be initialized in any manner (for example with random values) or indeed by determining the scalar product between each component $D^i$ and the vector y representing the digital image:

$$\beta_i = D^i \cdot y, \text{for } 1 \leq i \leq L$$

Moreover, an estimation of the noise variance ($\sigma^2$) is initialized, in any manner (for example with random values), or with the following relationship:

$$\sigma^2 = \frac{[y - D\beta]^H N^{-1}[y - D\beta] + a}{M + b}$$

β being at its initial value.

Iterated Steps

1. $P = |\beta|^q Z$ is computed, where q is a parameter set by the user; it is a question of a real number comprised between 1 and 2. The user may change the value of this parameter, depending on the final result, namely depending on the quality of the removal of the object from the image. Z is a diagonal matrix allowing the estimation of certain components to be privileged—in the general case Z will be an identity matrix. Z is parameterizable by the user.

2. An estimation matrix R is computed for the covariance matrix of the signal y of the digital image:

$$R = D \text{diag}(P) D^H + \sigma^2 N$$

3. A normalization term is computed:

$$\text{Nor} = |\beta_i|^{-q}$$

4. Next, each estimated amplitude of component $\beta_i$ is computed, using the formula:

$$\beta_i = \frac{D^{iH} R^{-1} y}{\text{Nor}}$$

5. The estimation of the noise variance $\sigma^2$ may for example be computed with the following formula:

$$\sigma^2 = \frac{[y - D\beta]^H N^{-1}[y - D\beta] + a}{M + b}$$

6. Optionally, the dictionary components may be modified so as to minimize a projection error c defined by:

$$\varepsilon = |y - D\beta|^2$$

Each dictionary component $D^i$ may in particular be updated with an update parameter comprised between 0 and 1:

$$D^i_{new} = (1 - \lambda) D^i_{old} + \lambda \left[ \frac{y - D\beta + D^i_{old} \beta_i}{\beta_i} \right]$$

where $D^i_{old}$ is the dictionary component $D^i$ to be updated and $D^i_{new}$ is the updated dictionary component $D^i$.

The update parameter λ may be set to $D^i$ there is, in this case, no update of the components of the dictionary.

The dictionary components $D^i$ may be updated using other methods, in particular the bisection method or the gradient-descent method.

This updating step may be applied to the content components of the dictionary of content components and/or to the object components of the dictionary of object components.

These six steps are repeated until convergence of the algorithm, namely until the estimation vector β and the estimation of the noise variance $\sigma^2$ converge. Since the noise variance $\sigma^2$ is directly dependent on β, convergence of one implies convergence of the other.

The estimation vector β and the estimation of the noise variance $\sigma^2$ may be considered to have converged when the norm of the estimation vector β remains below a preset threshold for two successive iterations, and when the value of the estimation of the noise variance $\sigma^2$ remains below a preset threshold for two successive iterations, respectively.

As a variant, convergence may be considered to have been reached at the end of a preset number of iterations. It is then possible to determine the value of the one or more parameters of the object (step c) in FIG. 3). Step c) comprises the sub-steps of:

determining a sub-set of object components of highest amplitude;

performing a linear combination of the object components of said sub-set.

The sub-set of object components of highest amplitude may in particular comprise a single component.

Using the algorithm described above, it is also possible to reconstruct the content, corresponding to the imaged real content (step d) in FIG. 3), by performing a linear combination of all the content components. This reconstruction allows an image without noise to be obtained.

2$^{nd}$ Embodiment

In this second embodiment, the noise present in the digital image is processed with the content and object, i.e. in one and the same matrix.

With respect to the first embodiment, the matrix D is therefore the result of the concatenation of the dictionary of object components, of the dictionary of content components, and of the information on the correlation of the noise present in the digital image (which forms the matrix N in the first embodiment).

y is the vector representing the digital image, namely the value of each pixel.

β is the estimation vector, of size L, containing the estimated amplitudes of each component $D^i$. Thus, $\beta = [\beta_1, \beta_2, \ldots, \beta_L]$.

q is a parameter of the algorithm. With respect to the first embodiment, there is no computation of the estimation of the noise variance $\sigma^2$; the parameters a and b are therefore not used.

Figure 7:
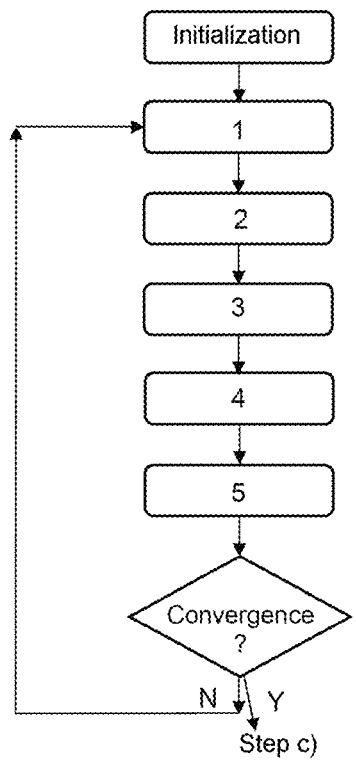
FIG. 7, a schematic illustration of the various steps of the algorithm for conjointly determining the amplitudes of object and content components, according to a second embodiment.

The conjointly determining algorithm also comprises an initializing step, and five iterated steps, as illustrated in FIG. 7.

Initializing Step

The value of the estimation vector β may be initialized in any manner (for example with random values) or indeed by determining the scalar product between each component $D^i$ and the vector y representing the digital image:

$$\beta_i = D^i \cdot y, \text{for } 1 \le i \le L$$

Iterated Steps

1. $P = |\beta|^q Z$ is computed, where q is a parameter set by the user; it is a question of a real number comprised between 1 and 2. The user may change the value of this parameter, depending on the final result, namely depending on the quality of the removal of the object from the image. Z is a diagonal matrix allowing the estimation of certain components to be privileged—in the general case Z will be an identity matrix. Z is parameterizable by the user.
2. An estimation matrix R is computed for the covariance matrix of the signal y of the digital image:

$$R = D \text{diag}(P) D^H$$

3. A normalization term is computed:

$$\text{Nor} = D^{iH} R^{-1} D^i$$

4. Next, each estimated amplitude of component $\beta_i$ is computed, using the formula:

$$\beta_i = \frac{D^{iH} R^{-1} y}{\text{Nor}}$$

5. Optionally, the components of the dictionary may be modified so as to minimize a projection error c in the same way as in the first embodiment.

These five steps are repeated until convergence of the algorithm, namely until the estimation vector β converges.

The estimation vector β may be considered to have converged when the norm of the estimation vector β remains below a preset threshold for two successive iterations.

As a variant, convergence may be considered to have been reached at the end of a preset number of iterations. Steps c) and d) are the same as for the first embodiment.

3$^{rd}$ Embodiment

In this third embodiment, the noise, the content and the object are processed separately. This separate processing may be justified by the different nature of the processed data: the noise is random, the content is modeled by a dictionary of content components and the object is modeled by a dictionary of object parameter components.

Let Dc be a matrix of M×Lc size containing the various components to be estimated of the content. Let Ds(µ) be a parameter matrix of size M×Ls containing the various components to be estimated of the object. The vector β is a parameter selected from a set comprising, non-exhaustively, the frequency, shape, size and location of the object. Lc is the number of components of the dictionary of content components and Ls is the number of components of the dictionary of object components. $Dc^i$, which is a vector of size M, is the $i^{th}$ component of the matrix Dc, and $Ds^i(\mu)$, which is a vector of size M, is the $i^{th}$ component of the matrix Ds(µ).

Let D be the matrix resulting from the concatenation of the dictionary Ds(µ) of object components and of the dictionary Dc of content components.

Information on the correlation of the noise present in the digital image is put into a matrix N, different from the matrices Dc and Ds(µ). The noise present in the digital image is therefore processed separately from the content and from the object. The correlation matrix N of the noise may be determined via a priori knowledge of the detector used to acquire the digital image. Specifically, the noise may be specific to each imaging technique (X-rays, infrared, visible). In particular, in X-ray imaging, the photonic noise is generally not white noise. The correlation matrix N of the noise may be estimated using the Wiener-Khintchine theorem, by taking the inverse Fourier transform of the spectral power density of a "flat" image, i.e. an image with no content.

As a variant, if it is assumed that there is no correlation between the pixels, N may be an identity matrix of M×M size.

Let y be a vector representing the digital image, namely the value (also called brightness) of each pixel.

Let βc be a content estimation vector, of size Lc, containing the estimated amplitudes of each component $Dc^i$ of the content. Thus, $\beta c = [\beta c_1, \beta c_2, \ldots, \beta c_{Lc}]$.

Let βs be an object estimation vector, of size Lc, containing the estimated amplitudes of each component $Ds^i(\mu)$ of the object. Thus, $\beta s = [\beta s_1, \beta s_2, \ldots, \beta s_{Ls}]$.

Let β be the vector resulting from the concatenation of the vector βs containing the amplitudes of the object components and of the vector βc containing the amplitudes of the content components.

Let a, b and q be parameters of the algorithm, a and b depending on the nature and on knowledge of the noise. If nothing in particular is known about the noise, then a=0 and b=0.

The algorithm for conjointly determining the amplitude of each of the content components of the dictionary of content components and of the object components of the dictionary of object components present in the digital image comprises an initializing step, and six iterated steps, as illustrated in FIG. 6.

Initializing Step

The values of the content estimation vectors βc may be initialized in any manner (for example with random values) or indeed by determining the scalar product between each component $Dc^i$ and the vector y representing the digital image:

$$\beta c_i = Dc^i \cdot y, \text{for } 1 \le i \le Lc$$

The values of the object estimation vectors βs may be initialized in any manner (for example with random values) or indeed by determining the scalar product between each component $Ds^i$ and the vector y representing the digital image:

$$\beta s_i = Ds^i(\mu) \cdot y, \text{for } 1 \le i \le Ls$$

Moreover, an estimation of the noise variance ($\sigma^2$) is initialized, in any manner (for example with random values), or with the following relationship:

$$\sigma^2 = \frac{[y - Dc\beta c - Ds(\mu)\beta s]^H N^{-1} [y - Dc\beta c - Ds(\mu)\beta s] + a}{M + b}$$

βc and βs being at their initial value.

Iterated Steps
1. $P=|\beta|^q Z$ is computed, where q is a parameter set by the user; it is a question of a real number comprised between 1 and 2. The user may change the value of this parameter, depending on the final result, namely depending on the quality of the removal of the object from the image. Z is a diagonal matrix allowing the estimation of certain components to be privileged—in the general case Z will be an identity matrix. Z is parameterizable by the user.
2. An estimation matrix R is computed for the covariance matrix of the signal y of the digital image:

$$R=D\mathrm{diag}(P)D^H+\sigma^2 N$$

3. A normalization term is computed:

$$\mathrm{Nor}=|\beta_i|^{-q}$$

4. Next, each estimated amplitude of component $\beta_i$ is computed, using the formula:

$$\beta_i = \frac{D^{i^H} R^{-1} y}{\mathrm{Nor}}$$

5. The estimation of the noise variance $\sigma^2$ may for example be computed with the following formula:

$$\sigma^2 = \frac{[y-Dc\beta c-Ds(\mu)\beta s]^H N^{-1}[y-Dc\beta c-Ds(\mu)\beta s]+a}{M+b}$$

6. Optionally, the object dictionary components may be modified so as to minimize a projection error c defined by:

$$\varepsilon=|y-Dc\beta c-Ds(\mu)\beta s|^2$$

Each dictionary component $D^i$ may in particular be updated with a new value of the parameter p using a gradient-descent method. To do this, J, called the Jacobian of the function $|y-Dc\beta c-Ds(\mu)\beta s|$ with respect to $\mu$:

$$J = \frac{\partial |y-Dc\beta c-Ds(\mu)\beta s|}{\partial \mu}$$

is used.
The new value of the parameter p is then given by $$\mu_{new}=\mu_{old}+[J^T\times J]^{-1}\times J^T\times|y-Dc\beta c-Ds(\mu)\beta s|$$

These six steps are repeated until convergence of the algorithm, namely until the estimation vector $\beta$ and the estimation of the noise variance $\sigma^2$ converge. Since the noise variance $\sigma^2$ is directly dependent on $\beta$, convergence of one implies convergence of the other.

The estimation vector $\beta$ and the estimation of the noise variance $\sigma^2$ may be considered to have converged when the norm of the estimation vector $\beta$ remains below a preset threshold for two successive iterations, and when the value of the estimation of the noise variance $\sigma^2$ remains below a preset threshold for two successive iterations, respectively.

As a variant, convergence may be considered to have been reached at the end of a preset number of iterations. It is then possible to determine the value of the one or more parameters of the object (step c) in FIG. 3). Step c) comprises the sub-steps of:
determining the value of $\mu$.

Using the algorithm described above, it is also possible to reconstruct the content, corresponding to the imaged real content (step d) in FIG. 3), by performing a linear combination of all the content components. This reconstruction allows an image without noise to be obtained.

The invention also relates to a method for removing an object present in a digital image representing an imaged real content, comprising the steps of:
estimating the value of at least one parameter of the object and its amplitude using the aforementioned parameter-estimating method;
determining the object on the basis of the parameter of the object and its amplitude;
subtracting pixel-by-pixel the object from the digital image.

Figure 8:
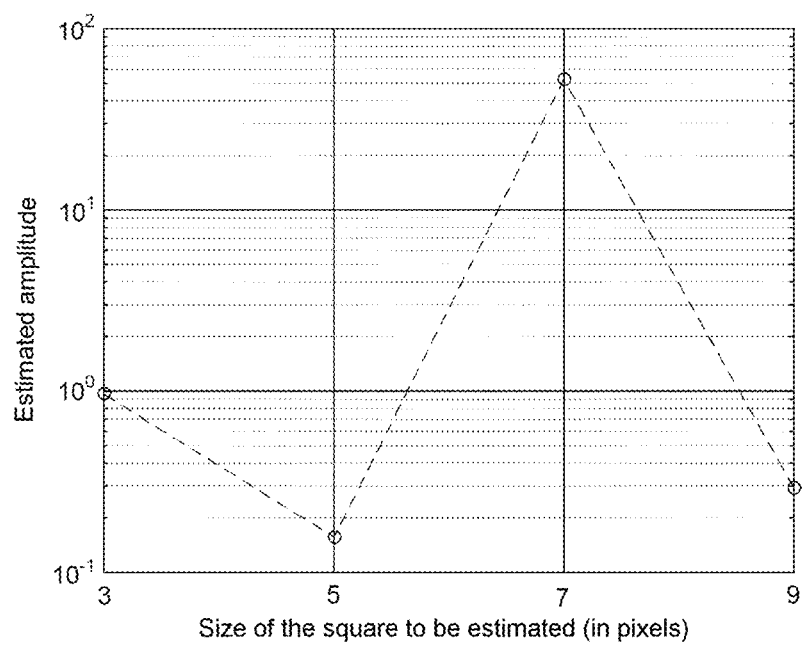
FIG. 8, a graph illustrating the amplitude of each object component.
Figure 9:
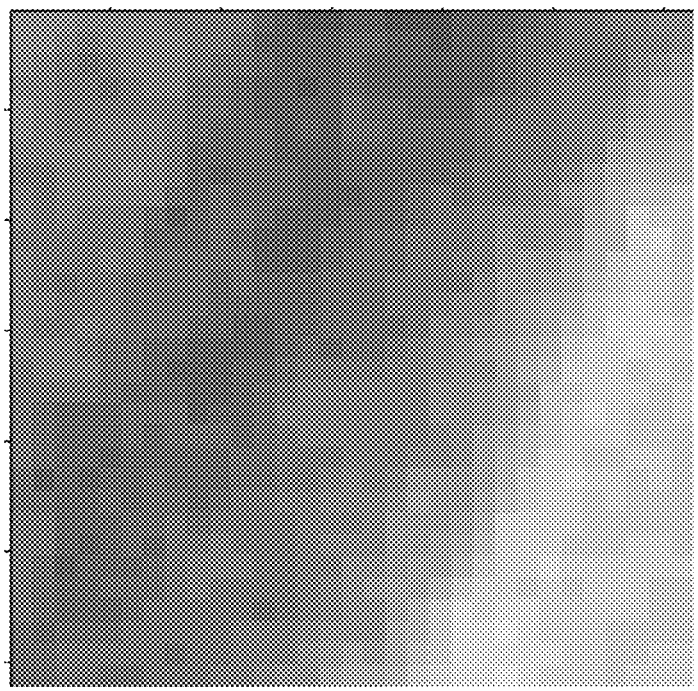
FIG. 9, the image of FIG. 2, from which the object has been removed.

Using the first embodiment of the algorithm, it is possible to obtain an estimation of the size and of the amplitude of the square. FIG. 8 shows the result of executing the algorithm. The parameter value of each component of the object dictionary is shown on the x-axis, and the estimated amplitude of each of these components is shown on the y-axis (in logarithmic scale). It is clear from this figure that the algorithm has detected a square of size 7 with a high amplitude. Thus, the square located in FIG. 2 is of width 7 and has an amplitude of 52. Using this information, it is then possible to correct the image so as to obtain a perfect correction, as illustrated in FIG. 9.

The method has been described for the entirety of an image formed by the detector. It may also be applied to one portion of the image formed by the detector, by adapting the dimensions of the matrices and of the vectors required to perform the parameter estimation.

The method has been described in the case of an additive object:

Image=Object+Content

It may be applied to the case of a multiplicative object:

Image=Object×Content

For example, the anti-scatter grid is a multiplicative object, the value of the frequency and its amplitude then depending on the patient. To pass from the additive case to the multiplicative case, it is enough to compute the logarithm of the image (and therefore of the vector y):

(Image)=log(Object)+log(Content)

Using the additive method described above, to obtain the estimation vector $\beta$, it is possible to estimate log(Object) and to deduce therefrom:

Object=$10^{log(Object)}$

The present invention may be used in any process requiring image quality to be improved. It is applicable, inter alia, to the field of medical imaging (X-ray radiography, scanners, MRI, etc.) and to any other type of imager (X-rays, visible, infrared).

Figure 1:
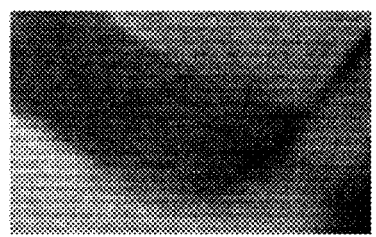
FIG. 1, which has already been described, an example of an oscillation present in an X-ray image and due to the presence of an anti-scatter grid.

Concrete applications for example concern:
The removal of a perturbation, different from noise, that degrades visibility and that may lead to a poor diagnosis in the case of medical imaging, as illustrated in FIG. 1. The invention advantageously allows the noise to be left in the digital image, this possibly being required by certain practitioners in medical imaging;
The characterization of objects for technical or medical purposes (for example the size of a lump in the body of the patient);

Denoising: if the first embodiment is used, it is possible to obtain an estimation of the object, of the content and of the noise (knowing the estimation of the noise variance $\sigma^2$). It is then possible to reconstruct the signal solely with the components of the object and of the content. The same operation may be performed with no object, to estimate only the content and the noise.

The method according to the invention is thus capable of correctly estimating each of the components of the dictionaries even though the latter contain many components. The use of an iterative method allows the components to be estimated one by one while filtering out each time as best as possible the other components estimated beforehand.

The invention claimed is:

1. A method for estimating one or more parameters of an object to be estimated in a digital image representing an imaged real content, comprising at least:
   a) an initial step comprising creating a dictionary of content components and creating a dictionary of object components, the content components and the object components having the same dimensions as the digital image;
   b) a step of conjointly determining an amplitude of each of the content components of the dictionary of content components and of the object components of the dictionary of object components present in the digital image;
   c) a step of determining a value of at least one parameter characterizing the object to be estimated on the basis of the amplitude of each of the object components.

2. The method as claimed in claim 1, the step c) of determining the value of at least one parameter characterizing the object to be estimated comprising the sub-steps of:
   determining a sub-set of object components of highest amplitude;
   determining the value of said at least one parameter depending on a linear combination of the object components of said sub-set.

3. The method as claimed in claim 1, the creating of the content dictionary comprising generating a set of images of two-dimensional sinusoidal signals.

4. The method as claimed in claim 1, the creating of the content dictionary comprising generating a set of images representative of a modulation transfer function of a sensor that forms the digital image.

5. The method as claimed in claim 1, the content dictionary being created using a machine-learning algorithm.

6. The method as claimed in claim 5, the machine-learning algorithm being a K-SVD algorithm.

7. The method as claimed in claim 1, the creating of a dictionary of object components comprising generating a set of images each having a different value of the parameter.

8. The method as claimed in claim 1, the parameter being selected from a set comprising a frequency, a shape, a size and a location of the object.

9. The method as claimed in claim 1, the conjointly determining step b) being carried out by iteratively determining an estimation vector ($\beta$) containing various amplitude values of each of the components of the content dictionary and of the object dictionary present in the digital image, until convergence of the estimation vector ($\beta$).

10. The method as claimed in claim 9, the estimation vector ($\beta$) being considered to have converged when a norm of the estimation vector ($\beta$) remains below a preset threshold for two successive iterations.

11. The method as claimed in claim 9, the estimation vector ($\beta$) being considered to have converged at an end of a preset number of iterations.

12. The method as claimed in claim 9, comprising, at an end of each iteration, a step of modifying the components of the dictionary of content components and/or of the dictionary of object components so as to minimize a projection error ($\varepsilon$) defined by:

$$\varepsilon = |y - D\beta|^2,$$

where y is a vector representing the digital image, and D is a matrix representing components of the dictionary to be modified.

13. The method as claimed in claim 9, the conjointly determining step b) comprising iteratively determining an estimation of a noise variance ($\sigma^2$), being determined on the basis of the estimation vector ($\beta$) and of a correlation matrix N of noise present in the digital image, until the estimation of the noise variance ($\sigma^2$) converges.

14. The method as claimed in claim 13, wherein the noise variance ($\sigma^2$) is defined by:

$$\sigma^2 = \frac{[y - D\beta]^H N^{-1} [y - D\beta] + a}{M + b}$$

where N is a correlation matrix of the noise, M is a number of pixels in the digital image, and a and b are parameters determined depending on a nature of the noise.

15. The method as claimed in claim 1, the conjointly determining step b) being carried out by iteratively determining a vector resulting from a concatenation of a content estimation vector ($\beta c$), containing various estimated amplitude values of each component of the imaged real content, and of an object estimation vector ($\beta s$), containing various estimated amplitude values of each object component.

16. The method as claimed in claim 15, comprising, at an end of each iteration, a step of modifying the components of the dictionary of content components and/or of the dictionary of object components so as to minimize a projection error ($\varepsilon$) defined by:

$$\varepsilon = |y - Dc\beta c - Ds(\mu)\beta s|^2,$$

where y is vector representing the digital image, Dc is a matrix representing the dictionary of content components, and Ds($\mu$) is a matrix representing the dictionary of object components.

17. The method as claimed in claim 16, the conjointly determining step b) comprising iteratively determining an estimation of a noise variance ($\sigma^2$), wherein the noise variance ($\sigma^2$) is defined by:

$$\sigma^2 = \frac{[y - Dc\beta c - Ds(\mu)\beta s]^H N^{-1} [y - Dc\beta c - Ds(\mu)\beta s] + a}{M + b}$$

where N is a correlation matrix of the noise, M is a number of pixels in the digital image, and a and b are parameters determined depending on a nature of the noise.

18. The method as claimed in claim 13, the correlation matrix N of the noise being determined via a priori knowledge of a detector used to acquire the digital image.

19. The method as claimed in claim 1, comprising a step d) of reconstructing the digital image of content via linear combination of all the content components.

20. The method as claimed in claim 1, the digital image being acquired by X-ray imaging.

21. A method for removing an object present in a digital image representing an imaged real content, comprising the steps of:
- estimating a value of at least one parameter of the object and an amplitude of said value, using the method as claimed in claim 1;
- estimating the object on a basis of the value of the at least one parameter characterizing the object and said amplitude;
- subtracting pixel-by-pixel the estimated object from the digital image.

\* \* \* \* \*